US008355495B2

(12) United States Patent
Malyar et al.

(10) Patent No.: US 8,355,495 B2
(45) Date of Patent: Jan. 15, 2013

(54) MULTI VENDOR NPAC ADMINISTRATION PEERING

(75) Inventors: John Phillip Malyar, Hillsborough, NJ (US); Richard Jacowleff, Lebanon, NJ (US); Adam Newman, Howell, NJ (US); George Tsacnaris, Piscataway, NJ (US); Joel Zamlong, Succasunna, NJ (US); Patrick Keenan White, Colts Neck, NJ (US); Lisa Marie Maxson, Centennial, CO (US); Chris Smaling, Englewood, CO (US)

(73) Assignee: Telcordia Technologies, Inc., Piscataway, NJ (US)

( * ) Notice: Subject to any disclaimer, the term of this patent is extended or adjusted under 35 U.S.C. 154(b) by 335 days.

(21) Appl. No.: 12/695,742

(22) Filed: Jan. 28, 2010

(65) Prior Publication Data

US 2011/0182417 A1    Jul. 28, 2011

Related U.S. Application Data

(60) Provisional application No. 61/155,282, filed on Feb. 25, 2009.

(51) Int. Cl.
*H04M 3/42* (2006.01)

(52) U.S. Cl. ........... 379/221.13; 379/112.01; 379/112.1; 379/207.01; 379/219

(58) Field of Classification Search ............... 379/221.1, 379/219, 221.09, 112.1
See application file for complete search history.

(56) References Cited

U.S. PATENT DOCUMENTS

| 6,160,880 | A  | * | 12/2000 | Allen ........................ 379/221.13 |
| 6,366,663 | B1 | * | 4/2002  | Bauer et al. ............... 379/221.13 |
| 2005/0220287 | A1 | * | 10/2005 | Aures et al. ............... 379/221.13 |

* cited by examiner

*Primary Examiner* — Joseph J Nguyen
(74) *Attorney, Agent, or Firm* — Philip J. Feig

(57) ABSTRACT

An architecture and accompanying method and apparatus for providing multi vendor administration of telephone numbers being ported from one service provider to another.

13 Claims, 4 Drawing Sheets

Service Providers Only Connect To Their NPAC Vendor

MULTI VENDOR NPAC ADMINISTRATION PEERING

CROSS REFERENCE TO RELATED APPLICATIONS

This application claims the benefit of U.S. Provisional Patent Application Ser. No. 61/155,282 filed 25 Feb. 2009 which is incorporated by reference as if set forth at length herein.

FIELD OF THE INVENTION

This invention relates generally to telecommunications networks and in particular to a method and system providing for the multi vendor administration of telephone number portability among multiple service providers including but not limited to wireline, wireless, and voice over Internet Protocol (VOIP) service providers.

BACKGROUND OF THE INVENTION

Under the Federal Communications Commission (FCC's) "local number portability" (LNP) rules, a telecommunications consumer may switch telephone service providers and keep their existing phone number(s)—so long as the consumer remains in the same geographic area. One benefit of local number portability has been increased consumer choices with respect to carriers, services, and costs.

Recently, the FCC has changed its local number porting rules to shorten the porting period for "simple" ports from the current four days to one business day. Given the importance of local number portability, methods and systems that facilitate such local number porting would represent an advance in the art.

BRIEF SUMMARY OF THE INVENTION

An advance is made in the art according to an aspect of the present invention directed to an architecture and accompanying method and apparatus for providing multi-vendor administration of telephone numbers being ported from one service provider to another.

In sharp contrast to existing architecture(s) and/or methods supporting number portability which only defines interfaces between a single regional NPAC SMS and service provider SOA and LSMS platforms, the present disclosure employs a multi-vendor NPAC Administration wherein the NPAC SMSs are peered (at least two NPAC SMS) and the NPAC SMSs cooperatively work together to accomplish industry standard operations flows used to effect number portability.

BRIEF DESCRIPTION OF THE DRAWINGS

A more complete understanding of the present disclosure may be realized by reference to the accompanying drawings in which.

DETAILED DESCRIPTION

Figure 1:
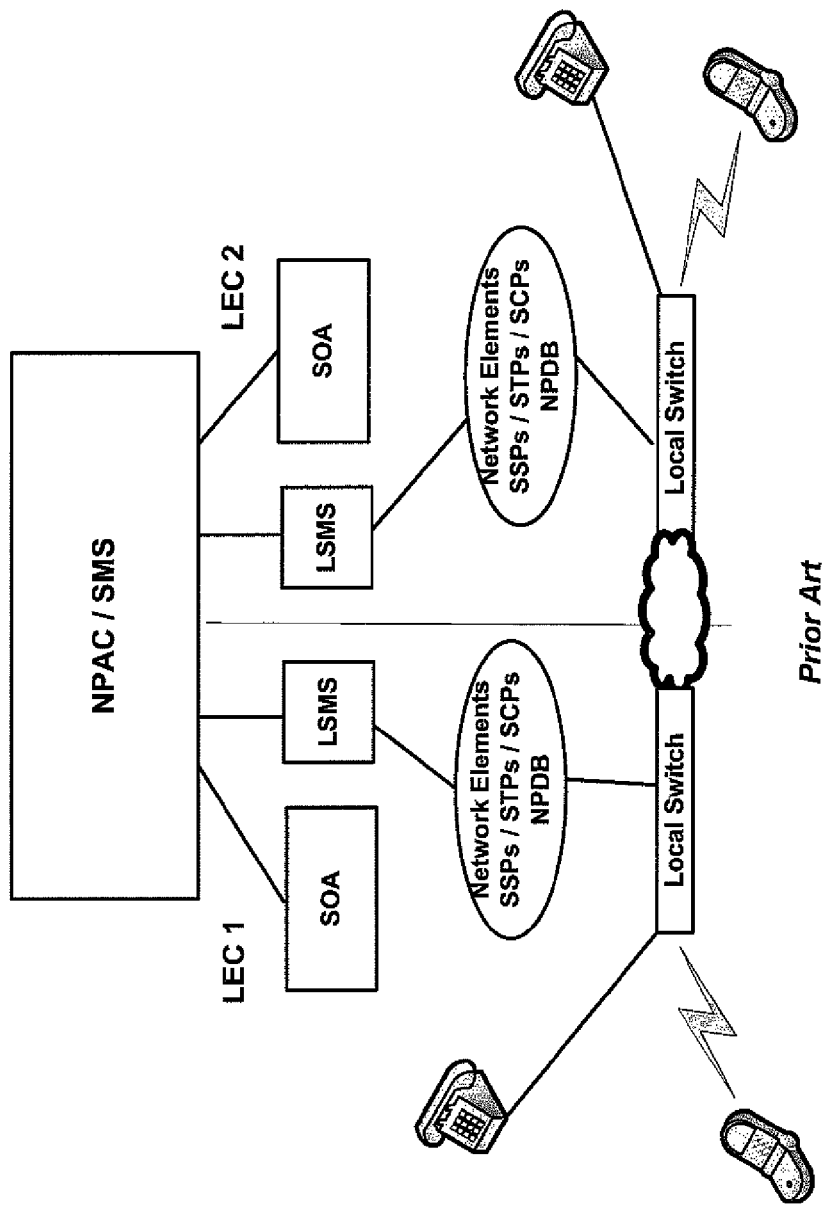
FIG. 1 is a schematic block diagram showing the prior art architecture for number portability and administration.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background we begin by noting that local number portability (LNP) is a network capability, which allows an end-user (telecommunications consumer) to change service provider (SP), location, and/or service type without having to change their telephone number(s). Advantageously, the ported numbers may be wired or wireless.

Three-types of LNP are: 1) Service Provider Portability—allows an end-user to change SP while retaining his/her telephone number; 2) Location (Geographic) Portability—allows an end-user to change from one geographic area to another (the current Location Routing Number (LRN) model does allow limited location portability within rate boundaries) while retaining his/her telephone number; and 3) Service Portability—allows an end-user to change service(s)

(e.g., CENTREX to POTS, etc) while retaining his/her telephone number with the same Service Provider.

Notably, the present disclosure is principally concerned with the first type namely, Service Provider Portability although it is applicable in certain respects to the other two types of number portability enumerated above and described in more detail below.

Service Provider Portability (SPP) is generally made technically feasible by a Location Routing Number (LRN) method employed by telecommunications network(s). LRN depends on Intelligent Network (IN) or Advanced Intelligent Network (AIN) capabilities which must be deployed in participating Service Provider (SP) networks. Generally speaking, LRN is a 10-digit number used to uniquely identify a switch that has ported numbers. The LRN for a particular switch is a number within a native NPA-NXX assigned to the SP for that switch.

Essentially, the LRN method assigns a unique 10-digit telephone number to each switch in a defined geographic area. In that manner, the LRN serves as a network address. Carriers routing telephone calls to end-user that have transferred their telephone number(s) from one carrier to another perform a database query to obtain the LRN that corresponds to the dialed telephone number. The database query is performed to identify the LRN associated with the called number. The carrier then would route the call to the new carrier based on the LRN.

With reference to FIG. 1, there is shown a simplified block diagram of the present-day, prior-art architecture supporting number portability in contemporary telecommunications networks. Shown in that FIG. 1 are Local Exchange Carriers (LEC), LEC1 and LEC2 residing in the same single geographic/administrative NPAC Region. As a consequence of that common residence, both LEC1 and LEC2 are served by a single Number Portability Administration Center (NPAC) and attendant Service Management System (SMS). As may be readily appreciated by those skilled in the art, present-day number portability architecture(s) provide a single NPAC/SMS for a particular geographic/administrative region.

As shown in FIG. 1, a number of network elements and operations systems are employed in a typical LEC environment that supports number portability. Those elements may include—for example—Service Switching Points (SSPs), Signal Transfer Points (STPs), Service Control Points (SCPs), Number Portability Data Base (NPDB) and a Local Service Management System (LSMS)/Service Order Administration system (SOA). Local switches service local subscribers via both wireless and wired telephones.

With this architecture, a particular region will have only a single NPAC servicing that region. As a result, the telephone number port is initiated via a LEC LSMS/SOA which in turn informs the NPAC of that port. The NPAC in turn provisions local NPDBs via the LSMS such that the network will then switch/route calls to the telephone corresponding to that ported number. As can be appreciated, this single NPAC architecture as shown exhibits a number of disadvantages which may be overcome by peered-NPAC architecture(s) and methods according to the present disclosure. More specifically, the peered-NPAC architectures and methods according to the present disclosure provide vendor diversity which may advantageously lead to improved reliability, availability and functionality.

Figure 2:
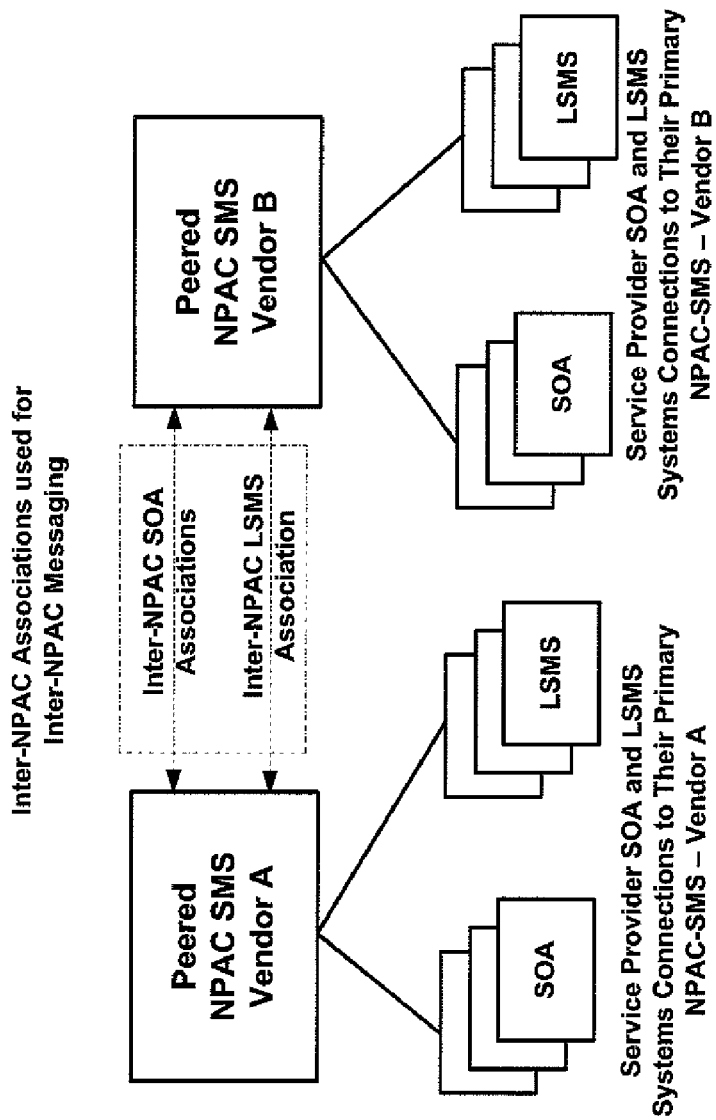
FIG. 2 is a schematic block diagram showing an architecture for number portability and administration according to an aspect of the present disclosure.

Turning now to FIG. 2, there is shown a simple block diagram depicting an architectural arrangement according to an aspect of the present disclosure. We begin by noting that the architecture shown in FIG. 2 illustrates an architecture in which there are two NPACs shown. Those skilled in the art will appreciate that inventive teachings according to the present disclosure are not so limited. More particularly, while the illustrative example of FIG. 2 shows a pair of NPACs serving an administrative region, the number may be greater than the simple paired arrangement shown.

With continued reference to FIG. 2, there is shown exemplary peered NPAC SMS centers for two vendors namely, Vendor A and Vendor B. As may be appreciated, in this architecture shown in FIG. 2 the two vendors each serve a common NPAC Region thereby allowing multiple service providers (not specifically shown) a choice of which NPAC Vendor (Vendor A or Vendor B) to use at a given time for porting numbers. Each NPAC/SMS exchanges number porting information/requests with one or more SOAs/LSMSs associated with, for example, one or more LECs.

As such, service provider (LECs) SOA and LSMS systems will connect to a primary NPAC SMS. As shown in FIG. 2, a number of service provider SOA and LSMS systems are connected to a primary NPAC SMS of Vendor A and a number of SOA and LSMS systems associated with different service providers are connected to a primary NPAC SMS of Vendor B.

As noted previously, an aspect of the present disclosure provides for multiple NPAC/SMS Administrators to co-exist in a single NPAC Region thereby providing service providers within that region a choice of vendor(s) to perform the NPAC/SMS administration. Advantageously, the multiple NPAC/SMS Administrators appear to one another as additional SOA/LSMS. Accordingly, the peered and/or multiple NPAC/SMS Administrators will coordinate their activities between one-another via a set of Inter-NPAC SOA Associations and a set of Inter-NPAC LSMS Association(s) established as part of a Common Management Information Service (CMIS) utilizing—for example—a Common Management Information Protocol (CMIP) which those skilled in the art will recognize as a service interface between the systems shown in FIG. 2.

Figure 3:
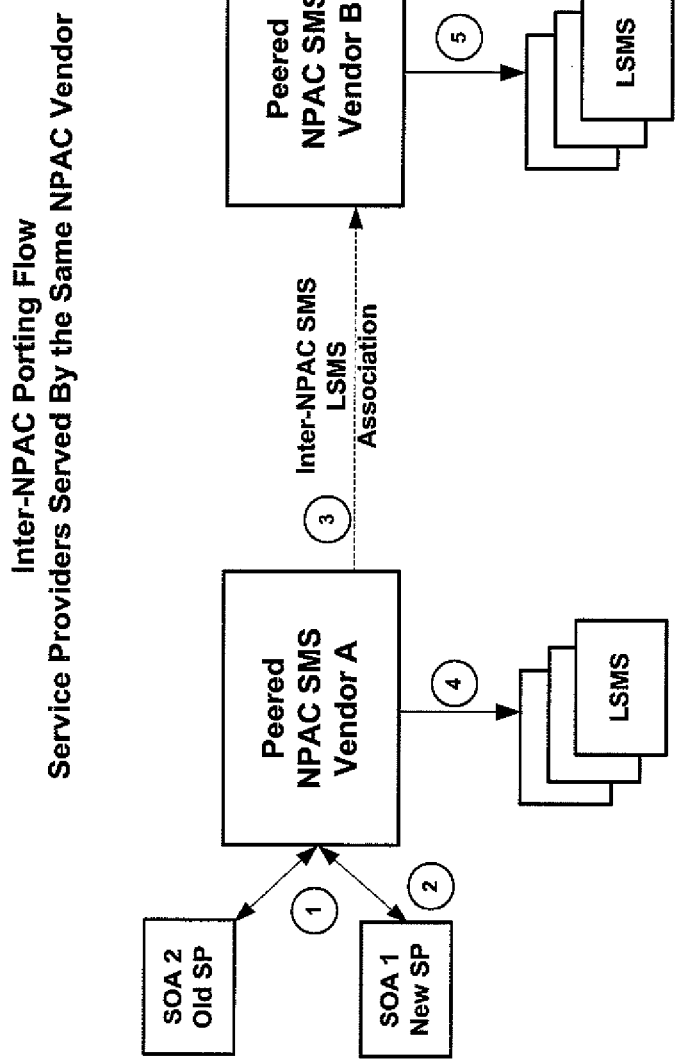
FIG. 3 is a schematic block diagram showing the steps involved in a port when a single NPAC SMS serves the two service providers involved in the port according to an aspect of the present disclosure.

With reference now to FIG. 3, there is shown a schematic block diagram depicting an NPAC Porting Flow wherein both service providers involved in the port are served by the same NPAC. As shown in FIG. 3, both service providers (LECs) each reside in the same NPAC Region and are served by a single NPAC SMS (NPAC SMS Vendor A). According to an aspect of the present disclosure, there are two, peered NPAC SMS within the region. Each of the peered NPAC SMS (Vendor A and Vendor B) support a number of local service management systems (LSMS).

For the example shown in FIG. 3 and others which follow, the steps are identified by a number appearing in a circle of the respective figure. In addition both the new service provider (New SP—that service provider to which the telephone number is being ported) and old service provider (Old SP—that service provider from which the telephone number is being ported) are identified as such.

Returning to FIG. 3, we begin by observing that Service Order Administration system 1 (SOA 1) and Service Order Administration system 2 (SOA 2)—both served by Vendor A NPAC—create a pending port for telephone number porting from SOA 1 (Step 1).

On a due date, i.e., the date on which the port is to take place, SOA 1 activates the ported telephone number (Step 2). Consequently a telephone number activation broadcast is sent to the peered NPAC SMS of Vendor B (Step 3) via Inter-NPAC SMS communications over the Inter-NPAC LSMS association. The telephone number activation broadcast is sent to any LSMS' serviced by Vendor A NPAC SMS (Step 4). Finally, the telephone number activation broadcast is propagated to any LSMS serviced by Vendor B NPAC SMS (Step 5).

Figure 4:
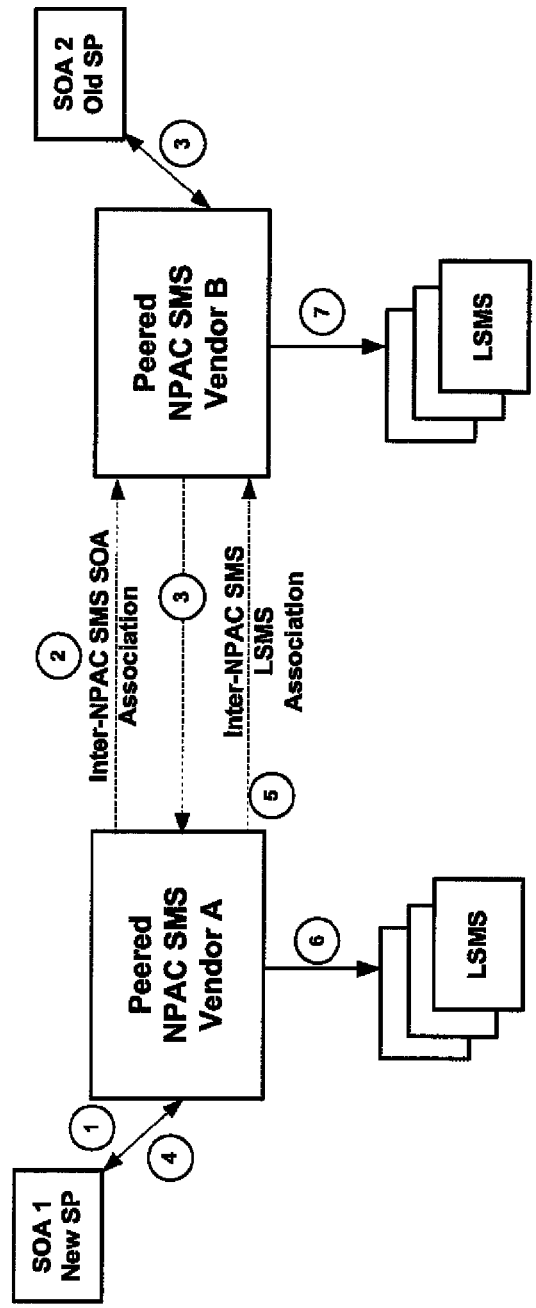
FIG. 4 is a schematic block diagram showing the steps involved in a port when the two service providers involved in the port are serviced by different NPAC SMS vendors according to an aspect of the present disclosure.

With reference now to FIG. 4, there is shown a schematic block diagram depicting an NPAC Porting Flow wherein both service providers involved in the port are served by a different NPAC. More particularly, in this exemplary configuration each of the two service providers (both old service provider and new service provider) involved in the port are—for example—customers of different NPAC SMS vendors. That is to say they use different NPAC SMS Administrators in the same region.

As shown in FIG. 4, the two peered NPAC SMS interact with one another via Inter-NPAC SOA and Inter-NPAC LSMS Associations. For this exemplary NPAC port, each is shown interacting with an individual SOA (SOA 1 and SOA 2) and a plurality of LSMS. With this architecture, an exemplary port of a telephone number involves the following steps.

First, a new service provider using SOA 1—serviced by Vendor A NPAC-SMS creates a pending port for a telephone number to be ported from SOA 2 (Step 1). Next, Vendor A NPAC-SMS forwards the create port request to Vendor B NPAC-SMS that serves SOA 2 (Step 2). At Step 3, Vendor B NPAC-SMS creates the pending subscription version and sends notification to both SOA 1 (via Vendor A NPAC SMS) and SOA 2. At Step 4, SOA 1 activates the telephone number on the due date.

Notably, for this example, any SOA 2 concurrence is not shown thereby reducing complexity of the figure. Accordingly, those skilled in the art will appreciate that such concurrence may of course be required and forthcoming.

At Step 5, the telephone number activation broadcast is sent from Vendor A NPAC-SMS to the peered Vendor B NPAC-SMS. At Step 6, the telephone number activation broadcast is sent to the LSMS that are served by Vendor A NPAC-SMS and finally—at Step 7—the telephone number activation broadcast is sent to the LSMS that are served by Vendor B NPAC-SMS.

As may be now appreciated, the peered NPAC-SMS method(s) and architecture(s) advantageously leverages existing SOA and LSMS to NPAC-SMS interface(s) to support NPAC SMS communications across the peered Inter-NPAC SMS association(s). More particularly, existing interface(s) is/are extended to include information that currently is only stored in a single NPAC SMS in the region thereby allowing all peered NPAC SMS implementations in the region to be synchronized and/or consistent.

Operationally, a service provider in a given region may establish a relationship with a NPAC SMS vendor of choice and continue operation without any impact to the existing North American Local Number Portability methodologies and operations flows. Logically, an SOA and LSMS system continue to interact with only one NPAC SMS (i.e., primary) and that NPAC SMS acts as a proxy thereby forwarding appropriate information to/from other NPAC SMS in that region.

To utilize existing CMIS interface(s) for peering as described herein, each NPAC SMS within a region associates to all other NPAC SMS within that region using both the SOA interface and LSMS interface. In order to support these interfaces, each peered NPAC SMS is preferably assigned at least one unique Service Provider ID to be used for connecting to other peered NPAC SMS via an Inter-NPAC SMS SOA association. Each peered NPAC SMS is then associated to other peered NPAC SMS with one Inter-NPAC SMS LSMS association and a minimum of one Inter-NPAC SMS SOA association.

At this point, while we have discussed and described the disclosure using some specific examples, those skilled in the art will recognize that our teachings are not so limited. More particularly, our inventive teachings provide for continuous operation wherein each NPAC SMS is physically connected to both a peered NPAC production site and any associated disaster recovery site(s) for a particular region. In a preferred embodiment, the NPAC SMS SOA association may utilize associated service provider functionality. In addition, multiple Inter-NPAC SMS SOA associations may be utilized to support SOA traffic between peered NPAC SMS. Recovery between peered NPAC SMS may be advantageously performed with a SWIM (send what I missed) and time based recovery mechanisms employed in contemporary systems while employing extensions for any additional data required for peered NPAC SMS functionality as now taught and described.

Accordingly, the invention should be only limited by the scope of the claims attached hereto.

What is claimed is:

1. A network arrangement for number portability comprising:
   a first Number Portability Administration Center (NPAC) associated with a first vendor situated within a given administrative region; and
   a second Number Portability Administration Center associated with a second vendor situated within the same administrative region;
   wherein the first NPAC and the second NPAC interact with one another via a set of Service Order Administration (SOA) associations and a set of Local Service Management Systems (LSMS) associations.

2. The network arrangement for number portability according to claim 1 further comprising:
   one or more SOA systems and one or more LSMS in communication with the first NPAC.

3. The network arrangement for number portability according to claim 2 further comprising:
   one or more SOA systems and one or more LSMS in communication with the second NPAC.

4. The network arrangement for number portability according to claim 1 further comprising:
   two or more SOA systems and two or more LSMS systems in communication with the first NPAC wherein at least two of the SOA systems and at least two of the LSMS systems are operated by different local exchange carriers (LEC).

5. The network arrangement for number portability according to claim 3 wherein at least one of the SOA systems in communication with the first NPAC and one of the SOA systems in communication with the second NPAC are operated by different local exchange carriers (LEC).

6. A method of porting a telephone number comprising the steps of:
   creating a pending port of the telephone number with a first Number Portability Assignment Center (NPAC) associated with a first vendor situated within a given administrative region;
   activating the telephone number on a due date;
   broadcasting the telephone number activation to a second Number Portability Assignment Center (NPAC) associated with a second vendor situated within the given administrative region;
   broadcasting the telephone number activation to one or more Local Service Management Systems (LSMS) served by the first NPAC;

propagating the broadcasted telephone number activation to one or more LSMS served by the second NPAC.

7. The method of claim 6 wherein the telephone number being ported is initially associated with a second Service Order Administration (SOA 2) such that after the port it is associated with a first Service Order Administration (SOA 1) system wherein both SOAs are served by the first NPAC.

8. The method of claim 7 wherein SOA 1 and SOA 2 are associated with different vendors.

9. The method of claim 7 wherein the telephone number activation is initiated via SOA 1.

10. The method of claim 7 wherein the pending port is initiated via SOA 1 and SOA 2.

11. A telephone number porting method comprising the steps of:

creating a request for a pending port of the telephone number with a first Number Portability Administration Center (NPAC) associated with a first vendor situated within a given administrative region wherein said NPAC services a first Service Order Administration (SOA 1);

forwarding the port request to a second NPAC associated with a second vendor within the given administrative region wherein said second NPAC services a second SOA (SOA 2);

generating by the second NPAC a notification of the port to both SOA 1 and SOA 2;

activating the telephone number on a due date through the effect of the SOA 1;

broadcasting the telephone number activation to the second NPAC;

broadcasting the telephone number activation to one or more Local Service Management Systems (LSMS) served by the first NPAC; and broadcasting the telephone number activation to one or more Local Service Management Systems (LSMS) served by the second NPAC.

12. The method of claim 11 wherein the telephone number is being ported from a second service provider operating the Service Order Administration (SOA 2) system to a first service provider operating the SOA (SOA 1) system.

13. The method of claim 12 wherein the telephone number activation is initiated via SOA 1.

* * * * *

UNITED STATES PATENT AND TRADEMARK OFFICE
CERTIFICATE OF CORRECTION

| | | |
|---|---|---|
| PATENT NO. | : 8,355,495 B2 | Page 1 of 1 |
| APPLICATION NO. | : 12/695742 | |
| DATED | : January 15, 2013 | |
| INVENTOR(S) | : Malyar et al. | |

It is certified that error appears in the above-identified patent and that said Letters Patent is hereby corrected as shown below:

In the Specification

In Column 2, Line 4, delete "disclosure;" and insert -- disclosure. --, therefor.

Signed and Sealed this
Twenty-fourth Day of March, 2015

Michelle K. Lee
*Director of the United States Patent and Trademark Office*